Dec. 3, 1940.    L. F. BRAUER    2,223,509

FLOAT VALVE

Filed May 24, 1939

INVENTOR
*Leo F. Brauer*
BY *Barry & Cyr*
ATTORNEYS

Patented Dec. 3, 1940

2,223,509

UNITED STATES PATENT OFFICE 2,223,509

FLOAT VALVE

Leo F. Brauer, Oklahoma City, Okla.

Application May 24, 1939, Serial No. 275,544

7 Claims. (Cl. 166—4)

This invention relates to a pressure release valve of general applicability, and more particularly, but not by way of limitation, to a float valve for use in connection with an oil well drill pipe coupling.

The conventional float valve utilized in oil well drill pipe couplings ordinarily utilizes a spring disposed around the valve stem in order to close the valve against its seat when fluid circulation in the well hole is stopped. Spring closed valves have many disadvantages in that they are sensitive to any variation in the downward flow of fluid circulation in the drill pipe which causes unnecessary reciprocation of the valve and undue wear on the valve stem as well as the spring member. Furthermore, in the drilling of an oil well, quite often the removal of the valve assembly while the drill pipe is still in the hole becomes necessary, so that a clear passageway to the bottom of the well can be obtained. In such event, with a conventional float valve assembly, it is necessary to pull the string of drill pipe in order to remove the various valve assemblies from the pipe.

It is therefore an important object of this invention to provide a float valve assembly eliminating springs for closing the valve against its seat, thus providing a longer life to the valve stem and valve assembly.

And still another important object of this invention is to provide a float valve for oil well drill pipe of such construction that any fluid circulation downward will immediately move the valve to open position.

And a further object of the invention is to provide a float valve assembly for an oil well drill pipe of such construction that it is readily dissolvable by acids normally used in the acidizing of wells.

And an additional object of this invention is to provide a float valve assembly for drill pipe of such brittle metallic composition so as to facilitate removal from the drill pipe by jarring or breaking means such as a "sinker bar," or the like, run into the drill pipe.

And still another important object of this invention is to provide a float valve assembly composed of a material of high tensile strength yet capable of being dissolvable by any normal chloride solution.

A further object of this invention is to provide a hollow float valve for a drill pipe composed of a material of low specific gravity to provide buoyant or floating characteristics to the valve when immersed in drilling fluid.

And an additional object of this invention is to provide a float valve of prolately spherical configuration in order to decrease swirling or rotative movement in the opening and closing of the valve.

Other objects and advantages of my invention will be evident from the following detailed description read in conjunction with the accompanying drawings which illustrate one form of my new invention.

Figure 1:
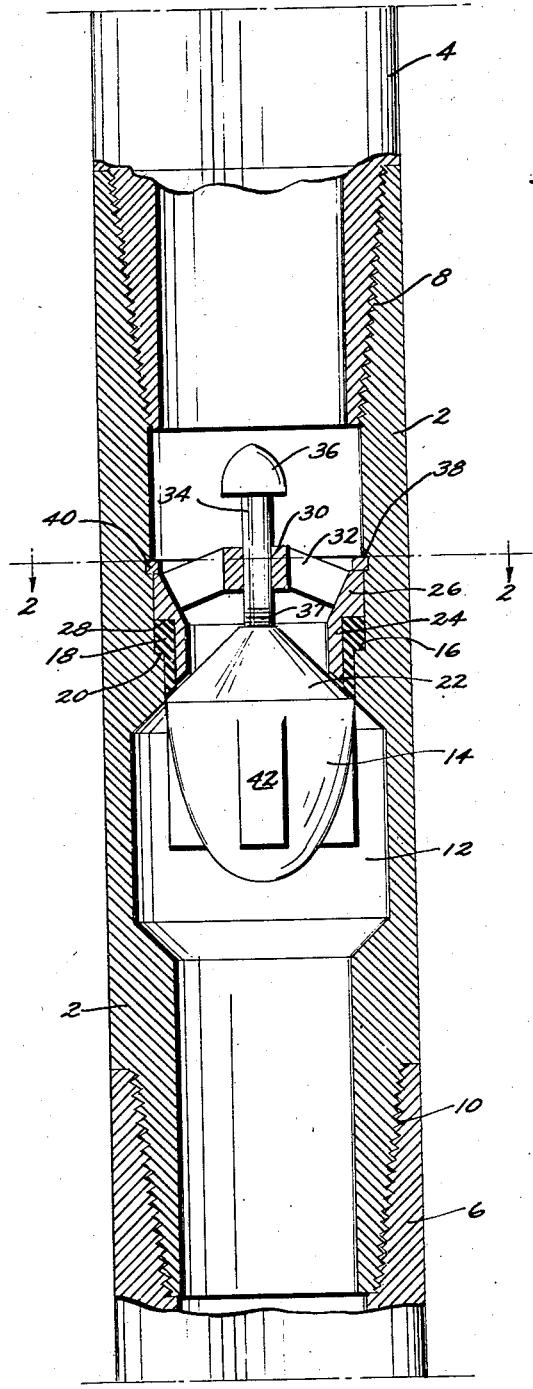
Fig. 1 is a vertical sectional view of a drill pipe coupling showing the float valve assembly in an operative position.

Referring now more particularly to the drawing wherein like numerals of reference designate similar parts in each of the figures, the reference character 2 designates a coupling member adapted to interposed between connected sections of drill pipe 4 and 6 by means of standard threads 8 and 10. The coupling member 2 has a larger inside cavity or bore 12, both ends of which are bevelled as clearly shown in Fig. 1. Above the bore 12, the inside diameter of the coupling 2 is reduced to a bore which is only slightly larger in diameter than the over all diameter of valve member 14.

At a point above the bore 12 the coupling member 2 is formed with an annular upwardly facing inside shoulder portion 16 adapted to receive a tubular resilient valve seat 18. The seat 18 is fitted downwardly through the bore of the coupling member 2 and has an externally enlarged portion forming a downwardly facing shoulder 20 adapted to rest on the shoulder 16. The resilient valve seat 18 is shaped to fit snugly within the coupling member 2 and its lower end is flared out and flush with the tapered wall or bevelled portion of the upper end of the bore 12, so that the upperly tapered or frusto-conical shaped top portion 22 of the valve 14 will fit closely against the lower end of the seat 18 when the valve is in operating or closed position (Fig. 1.)

A tubular spider 24 is disposed in the upper end of the valve seat 18, and is provided with an enlarged portion 26 adapted to fit snugly within the bore of the coupling 2, thus forming an external annular shoulder 28 resting on the upper end of the seat 18. The lower end of the spider is outwardly flared and spaced slightly above the tapering surface 22 of the valve 14 when the valve is closed to allow for resilient expansion of the seat 18 under pressure of the valve. The upper end of the spider is provided with a centrally disposed bearing 30 carried by spaced arms 32 formed integrally with the spider and bearing 30. A valve stem 34 having an enlarged head portion 36 is adapted to work through the bearing 30 and is provided with standard threads 37 at its lower end providing a sealed connection between the stem 34 and a threaded recess (not shown) of the valve 14. The head portion 36 keeps the valve 14 in assembled relation with the spider 24.

Figure 2:
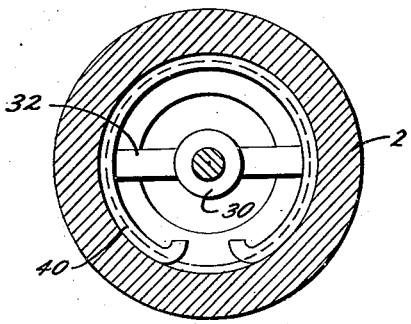
Fig. 2 is a view taken on lines 2—2 of Fig. 1.
Figure 3:
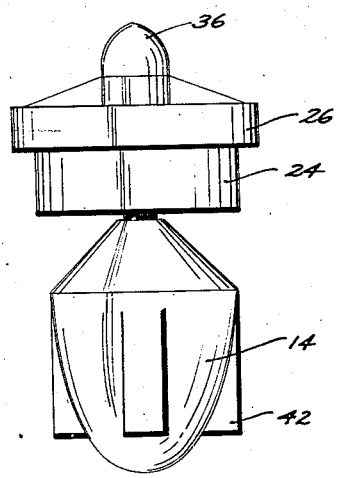
Fig. 3 is a detail view in elevation of the float valve assembly.

Immediately above the spider 24 the inner periphery of the coupling 2 is provided with an annular groove 38 adapted to receive a lock spring 40. The spring 40 is substantially circular in shape, and as clearly shown in Fig. 2, is open at one side with its free ends turned inwardly for facilitating removal from the coupling by any suitable tool. The inside diameter of the snap ring or spring 40 is somewhat less than the inside diameter of the bore of the coupling 2 as well as being less than the outside diameter of the spider 24 in order that it will lock against the upper end of the spider 24. The locking ring 40 is particularly advantageous in that it eliminates the necessity of the end portion of the drill pipe 4 contacting the spider 24 in order to hold the valve assembly in place. This arrangement allows the pipe 4 and the coupling 2 to be connected at a point above the valve assembly in order to provide stock for re-threading in case the threads are damaged due to fluid circulation without interfering with the position of the valve assembly.

The valve 14 is preferably constructed with a recess or cavity (not shown) providing a hollow valve body of reduced weight for a purpose to be hereinafter set forth. The lower portion of the valve 14 is substantially prolately spherical in shape to provide a streamlined body in order to decrease any possibility of swirling or rotative movement in the opening and closing of the valve. Such swirling movement has a tendency to restrict fluid flow around the valve as well as cause an abrasion action and undue wear between the valve stem 34 and the bearing 30. A plurality of spaced projections or lugs 42 are disposed on the valve 14 and are adapted to contact the lower beveled portion of the bore 12 in order to prevent any possibilities of the valve plugging the pipe string.

Referring now to the composition of the valve assembly, the valve 14 is preferably formed from a material having a high degree of tensile strength yet is easily dissolvable by dilute hydrochloric acid or other chloride solutions normally used in acidizing oil wells. Furthermore, the composition of the material is preferably such that the specific gravity is approximately 1.8, which in conjunction with the hollow feature of the valve, provides a light body capable of floating or being buoyant in fluid for a purpose that will be hereinafter set forth.

The composition of the valve body proper has substantially the following range of ingredients:

| | Per cent |
|---|---|
| Magnesium | 98 |
| Aluminum | 1 |
| Impurities | 1 |

Ordinarily, magnesium is not strong enough to stand conventional heat treating methods, and in view of this, the metal is provided with aluminum and other impurities in order to increase the tensile strength so that the valve proper can be treated.

It will be apparent that the valve stem 34, stem head 36 and the spider 24 can be made of a rigid material, but is preferably the same composition as that of valve member 14 which is heat treated, in order to be brittle enough to facilitate removal from the drill by breaking with a heavy sinker bar or the like run into the drill pipe from the top of the well.

Operation

In operation of the device, the coupling is constructed and fitted with the valve mechanism as described. In running in a string of drill pipe the valves 14 are closed due to the buoyant feature of the valve when immersed in the fluid of the well which allows the tapered portion 22 to lift itself into a seating position against the seat 18. Circulating fluid may be pumped downwardly through the string and upon coming into contact with the valve 14 will immediately move it into open position to allow the fluid to circulate around the valve. As long as the fluid is being pumped downward, the valve 14 remains set in open position rather than have a reciprocatory movement on each stroke of the fluid pump.

In the drilling of an oil well it very often becomes necessary to provide a clear passageway in the drill string to the bottom of the well, e. g., such as "shooting" the well and the like, and before this can be accomplished it is necessary to remove any valve assemblies present in the drill string. The metallic composition of the valve assembly is such that it can be readily dissolved by a solution of dilute hydrochloric acid or similar chloride solutions, normally used in the acidizing of wells for enlarging drainage channels and dissolving lime formations so that the oil and gas may flow more freely. In case it is necessary to remove the valve assembly prior to acidizing, a "breaker or sucker bar" may be lowered into the drill pipe, and due to the brittleness of the composition, the valve assembly can be readily broken to facilitate removal.

Changes may be made in the combination and arrangement of parts as heretofore set forth in the specification and shown in the drawing, it being understood that any modification in the precise embodiment of the invention may be made within the scope of the following claims without departing from the spirit of the invention.

What I claim is:

1. A float valve assembly for use in a drill pipe comprising a spider anchored in the pipe, a valve stem cooperating with the spider, a valve attached to one end of the stem and provided with a hollow prolate portion adapted to be sealed off by the stem, said valve so constructed and arranged to possess buoyant characteristics.

2. A drill pipe float valve assembly in combination with a coupling comprising a prolate valve body operably mounted in the coupling, a stem connected to the body, a resilient annular valve seat disposed in the coupling, an annular spider engaging the inner wall of the seat and acting as a guide for the valve stem, said valve assembly formed chiefly from a material having highly dissolvable characteristics.

3. A drill pipe float valve assembly in combination with a coupling comprising a valve body operably mounted in the coupling, a stem connected to the body, a resilient annular valve seat disposed in the coupling, an annular spider engaging the inner wall of the seat and acting as a guide for the valve stem, said valve being substantially prolately constructed to diminish any swirling action of the valve during movement thereof.

4. A float valve assembly for use in a drill pipe comprising a tubular body having a bore, an annular valve seat in the bore, a spider fixedly arranged in the bore, a stem slidably guided by said spider, and a gravity-opened float valve secured to one end of said stem and adapted to close in an upward direction against said seat under fluid pressure exerted below the valve, said valve being buoyant and stream-lined in the direction of the flow of fluid through said bore.

5. A float valve assembly for use in a drill pipe comprising a tubular body having a bore, an annular valve seat in the bore, a spider fixedly arranged in the bore, a stem slidably guided by said spider, and a gravity-opened prolate float valve secured to one end of said stem and adapted to close in an upward direction against said seat under fluid pressure exerted below the valve, said valve being buoyant and formed of a material having high tensile strength, low specific gravity and readily dissolvable by acids normally used in the acidizing of wells.

6. A float valve assembly for use in a drill pipe comprising a tubular body having a bore with an enlarged portion which terminates in a shoulder at its lower end, an annular valve seat in the bore at the upper end of said enlarged portion, a spider secured in the bore above its enlarged portion, a stem slidably guided by said spider and having means at its upper end to limit downward movement of the stem, and a gravity-opened float valve secured to the lower end of said stem, normally occupying the enlarged portion of the bore and adapted to close in an upward direction against said seat under fluid pressure exerted below the valve, said valve being buoyant and stream-lined in the direction of the flow of the fluid through the bore, and vertical spaced lugs projecting radially from the valve and adapted to seat on said shoulder in the event of breakage of the spider or stem.

7. A float valve assembly for use in a drill pipe comprising a spider anchored in the pipe, a valve stem cooperating with the spider, a valve attached to one end of the stem and provided with a hollow prolate portion adapted to be sealed off by the stem, said valve assembly formed chiefly from a material having high dissolvable and buoyant characteristics.

LEO F. BRAUER.